UNITED STATES PATENT OFFICE.

JAMES H. STEBBINS, JR., OF NEW YORK, N. Y.

PRODUCTION OF NAPHTHYL-SULPHATE SODA SALT.

SPECIFICATION forming part of Letters Patent No. 256,400, dated April 11, 1882.

Application filed January 27, 1882. (Specimens.)

*To all whom it may concern:*

Be it known that I, JAMES H. STEBBINS, Jr., a citizen of the United States, residing at New York, in the county and State of New York, have invented certain new and useful Improvements in Production of the Soda Salt of Naphthyl-Sulphate, of which the following is a specification.

This invention relates to the production of a soda salt of naphthyl-sulphate which can be used with advantage in the preparation of coloring-matters or dye-stuffs.

In carrying out this invention I take one part of finely-pulverized beta-naphthol and stir it together with three parts of strong sulphuric acid of 1.84 specific gravity. The reaction commences almost immediately and the temperature begins to rise; but care must be taken not to allow the temperature to rise much above 20° centigrade. The mass, which at the beginning is semi-liquid, solidifies after a short time into a crystalline condition, when the reaction is complete. The acid mixture thus obtained is diluted with water and filtered in order to separate from it unchanged beta-naphthol, and then the acid mixture is heated to boiling, neutralized with carbonate of lime, and filtered. The hot filtrate is treated with carbonate of soda, filtered, and the filtrate evaporated to dryness.

The compound thus obtained consists of the soda salt of a beta-naphthol-monosulpho-acid and the soda salt of naphthyl-sulphate, which salts are readily separated by hot alcohol. For this purpose I take one part of the finely-powdered compound and boil it for about ten minutes in about four parts, by weight, of alcohol of ninety per cent., then filter hot, and the salt which remains on the filter is collected and set aside. The filtrate is put into a distilling apparatus and the alcohol removed by distillation. The residue thus obtained is the soda salt of naphthyl-sulphate. This soda salt is decomposed by evaporation with caustic soda into beta-naphthol and sulphate of soda, and by boiling with hydrochloric acid into beta-naphthol and acid sulphate of soda. By the action of bromine it is decomposed into beta-bromenaphthol and sulphate of soda.

What I claim is—

The soda salt of naphthyl-sulphate produced by treating beta-naphthol with sulphuric acid and separated from other matters by the action of hot alcohol, substantially in the manner herein set forth.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.